(12) United States Patent
Kaupp

(10) Patent No.: US 6,431,391 B1
(45) Date of Patent: Aug. 13, 2002

(54) HOLDER FOR A BEVERAGE CONTAINER

(75) Inventor: Klaus Kaupp, Waldachtal (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/909,286

(22) Filed: Jul. 19, 2001

(30) Foreign Application Priority Data

Jul. 20, 2000 (DE) .......................................... 100 35 272

(51) Int. Cl.[7] .............................................. B65D 71/00
(52) U.S. Cl. .................................... 220/737; 248/311.2
(58) Field of Search .......................... 220/737; 428/685, 428/503, 352, 311.2

(56) References Cited

U.S. PATENT DOCUMENTS

| | | | | |
|---|---|---|---|---|
| 5,503,297 A | * | 4/1996 | Frankel | 220/737 |
| 5,590,808 A | * | 1/1997 | Schaeppi | 220/737 |
| 5,800,005 A | * | 9/1998 | Arold et al. | 248/311.2 |
| 6,059,244 A | * | 5/2000 | Bilandzic et al. | 248/311.2 |
| 6,065,729 A | * | 5/2000 | Anderson | 248/311.2 |
| 6,105,917 A | * | 8/2000 | Yabuya et al. | 248/311.2 |

FOREIGN PATENT DOCUMENTS

JP              07009905 A          1/1995

* cited by examiner

*Primary Examiner*—Joseph M. Moy
(74) *Attorney, Agent, or Firm*—Michael J. Striker

(57) ABSTRACT

A holder for a beverage container has a holding element provided with an insertion opening for a beverage container; a slideway guide provided on the holding element so that the holding element is guided to be displaceable from a non-use position into a use position and vice versa, the holding element being curved in an arc in a displacement direction, the slideway guide being formed as an arcuate guide and guiding the holding element in such a manner that the holding element is displaceable in an arc in direction of its curved shape.

5 Claims, 4 Drawing Sheets

HOLDER FOR A BEVERAGE CONTAINER

BACKGROUND OF THE INVENTION

The present invention relates to a holder for a beverage container, for example a beaker, a cup, a can and the like.

Such holders are known in an almost incomprehensibly large number of designs. Such known holders have a holding element with an insertion opening for the insertion of the beverage container. Furthermore, the holders have a slideway guidance means with which the holding element is guided so as to be displaceable back and forth between a non-use position and a use position. In the non-use position the holding element is usually recessed in, for example, the dashboard of a motor vehicle. In the use position, the holding element projects out of the dashboard so that the insertion opening is accessible and a beverage container can be inserted and removed.

SUMMARY OF THE INVENTION

Accordingly, it is an object of the present invention to provide a holder for a beverage container which avoids the disadvantages of the prior art, and more particularly makes good use of an installation space.

In keeping with these objects and with others which will become apparent herein after, one feature of present invention resides, briefly stated in that the holding element of the holder according to the invention is curved in an arc in a displacement direction and its slideway guidance means is constructed in the form of an arcuate guidance means. The holding element of the holder according to the invention is displaceable in an arc in the direction of its curved shape from the non-use position into the use position and vice versa. It is possible, but not necessary, for the curved shape of the holding element to correspond to the curvature of a path described by the holding element during its displacement.

As a result of the arcuate construction of the holding element and its arcuate displacement movement, the holding element during its displacement circumscribes a chamber which can be utilized as a compartment, for example, for the storage of small articles, for the installation of switches, instruments etc., or for the accommodation of an ash tray, a coin tray or the like. As a result, the invention has the advantage of good utilization of the installation space required for the holder. A further advance of the invention lies, from the aesthetic standpoint, in the unusual shaping of the holding element and its unusual displacement movement.

In a preferred configuration of the invention, the holding element is curved in an arc of a circle, it has the shape of a portion of the curved surface of a cylinder. The slideway guidance means of the holder in this configuration of the invention is constructed in the shape of an arc of a circle, it guides the holding element on a circular path coaxial with the notional axis of the cylindrical holding element.

In a further development of the invention the holder has a support element which provides support against tipping-over for a beverage container inserted into the insertion opening of the holding element, the support being provided at one point or over a circumferential region of the beverage container. The support element is pivotally mounted on the holding element so as to be able to pivot from a position in which it rests against the holding element into a position in which it projects away from the holding element and vice versa. The support reliably supports a beverage container inserted into the holder against tipping-over. Because the support element is pivotable into a position in which it rests against the holding element, it can be accommodated in a space-saving manner when the holder is not in use.

Preferably the support element is curved in an arc in correspondence with the holding element, that is to say its curvature is matched to that of the holding element. As a result, when the support element is not in use it can be pivoted into a space-saving position in which it rests against the holding element substantially over its entire length in the circumferential direction.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
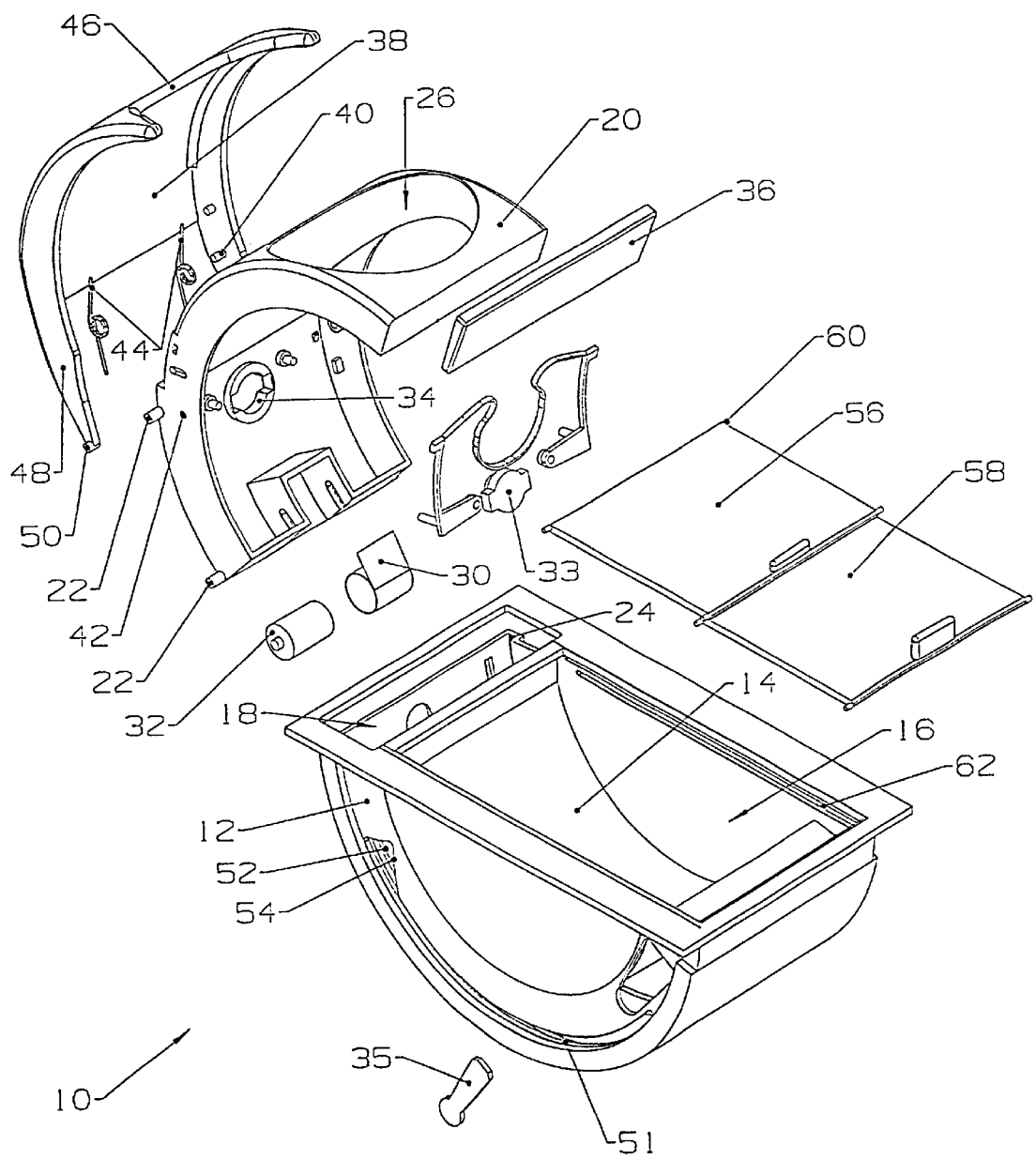
FIG. 1 is a view perspective exploded view of a holder in accordance with the present invention.

As shown in the drawing, the holder 10 according to the invention for a beverage container, such as, for example, a beaker, a cup or a can, is intended for recessed installation in, for example, the central console of a motor vehicle (not shown). The holder 10 has a semi-cylindrical housing 12 divided by a semi-cylindrical dividing wall 14, which is coaxial with the housing 12, into a storage compartment 16 for small articles and a cylindrically curved receiving chamber 18 for a holding element 20. The holding element 20 has a cylindrically curved shape corresponding to the receiving chamber 18, the holding element 20 forms a portion of the curved surface of a cylindrical extending circumferentially through somewhat less than 180°.

The holding element 20 is guided in the housing 12 by an arc-of-a-circle guidance means 22, 24 so as to be displaceable in the direction of its curved shape, the notional axis of an arc-of-a-circle-shaped path described by the holding element 20 during its displacement being coaxial with the notional axis of symmetry of the housing 12, which corresponds to the notional axis of symmetry of the cylindrical holding element 20. For guidance in an arc of a circle, the holding element 20 has on each side two outwardly projecting guide pins 22. One of the two guide pins 22 is arranged at one end of the holding element 20 and the other guide pin 22 is arranged spaced apart in the circumferential direction from the one guide pin 22.

Figure 2A:
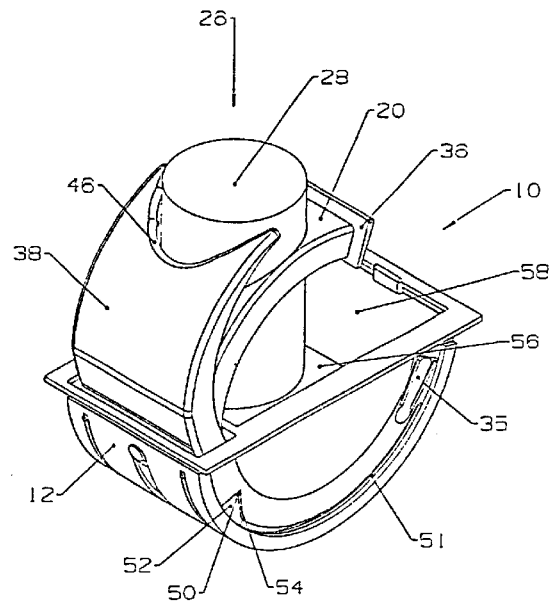
FIGS. 2a, 2b, 2c are perspective views of the holder of FIG. 1 in an assembled state, in various positions.
Figure 2B:
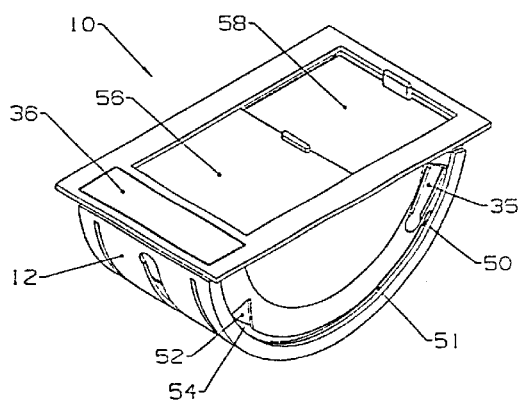

The guide pins 22 lie in a guide path 24 of the housing 12 formed by a groove in each side wall of the housing 12. The guide path 24 extends in an arc of a circle coaxial with the notional axis of symmetry of the housing 12. By means of the arc-of-a-circle guidance means 22, 24 the holding element 20 can be displaced along an arc-of-a-circle-shaped path between a non-use position, in which it is recessed in the receiving chamber 18 of the housing 12, and a use position in which it projects out of the housing 12. The non-use position is shown in FIGS. 2b, c and 3b and the use position is shown in FIGS. 2a and 3a.

Figure 3A:
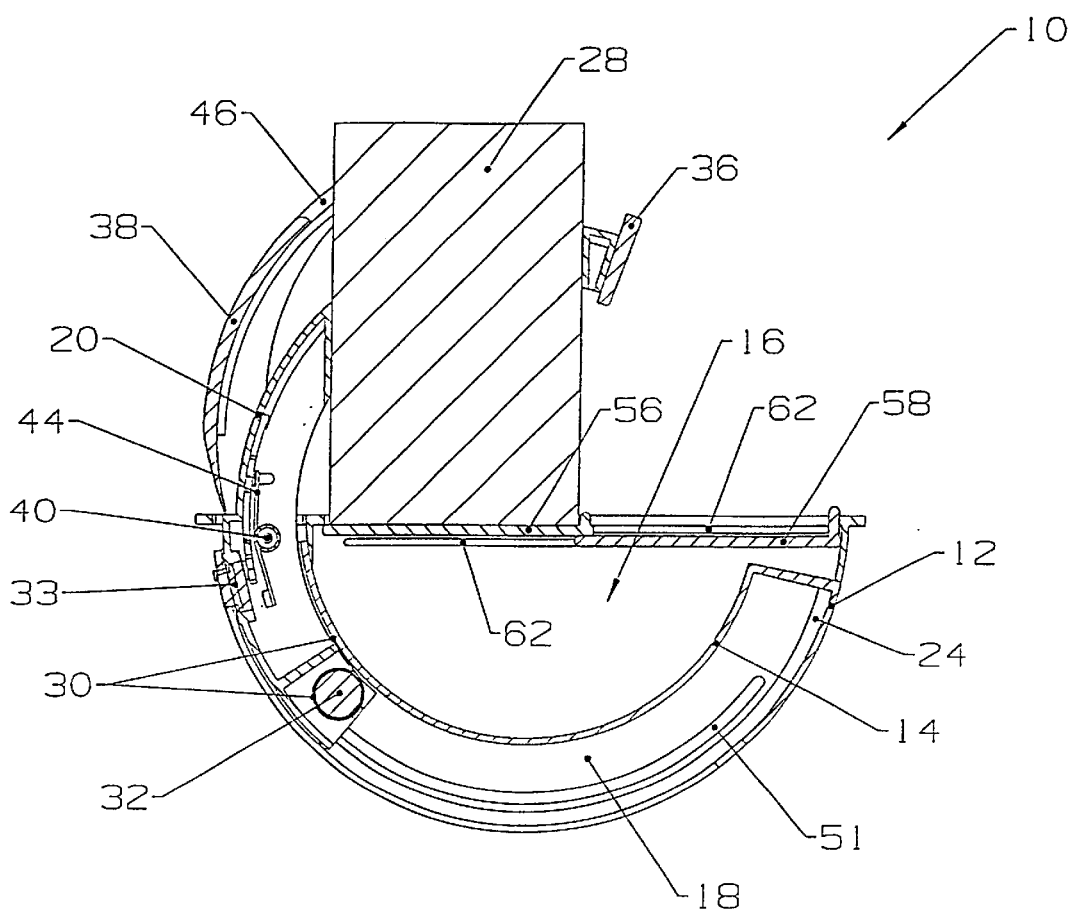
FIGS. 3a, 3b are views showing a cross-section through the holder of FIG. 1 in an assembled state in two different positions.
Figure 3B:
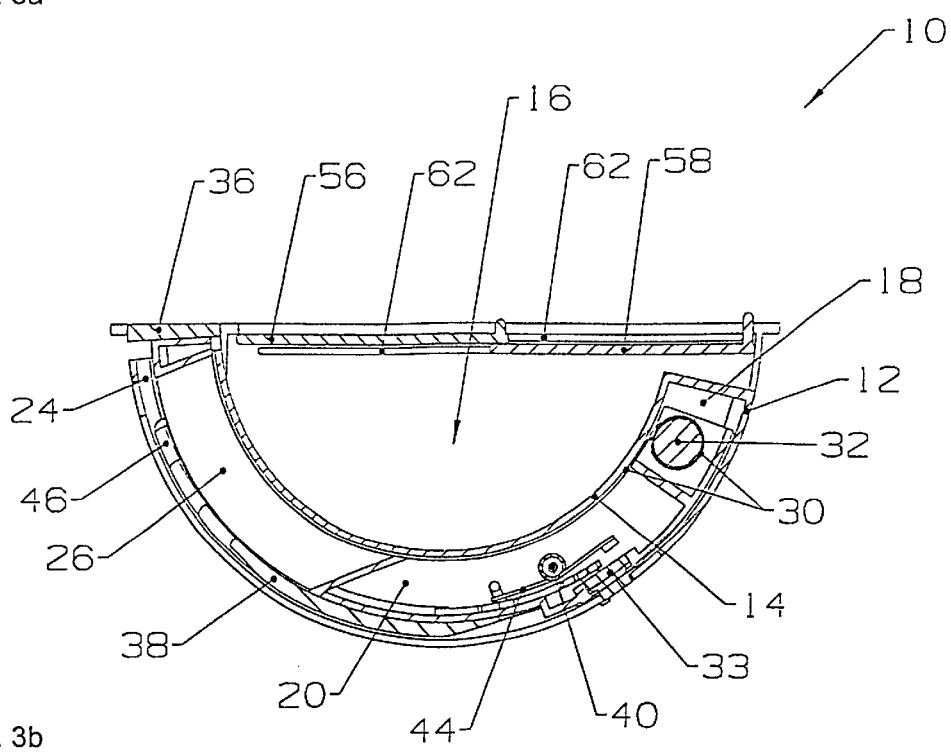
Figure 4:
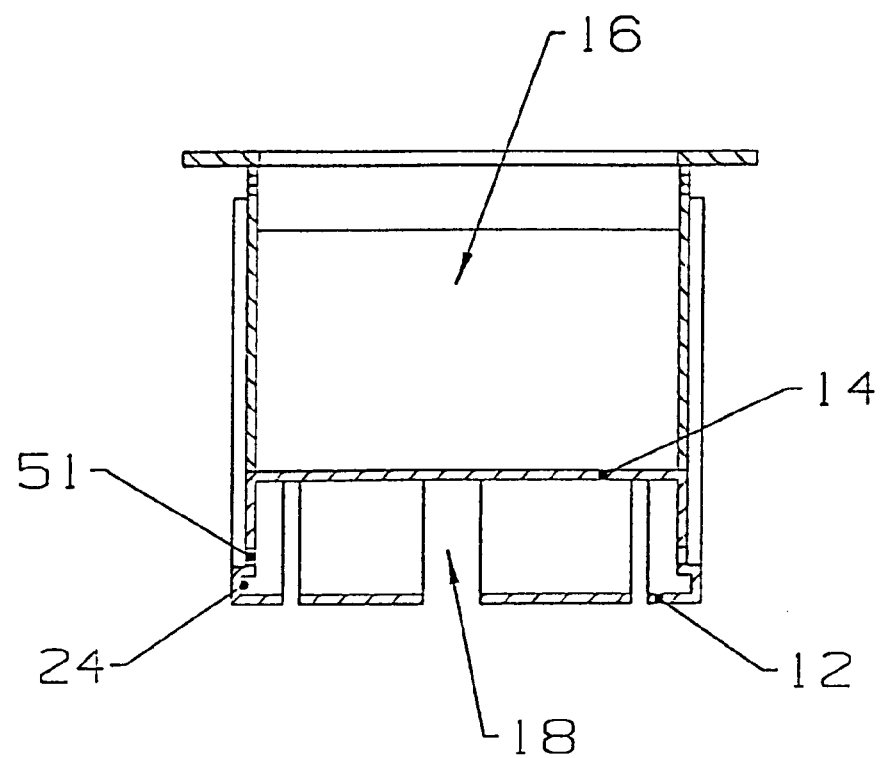
FIG. 4 is a view showing a detail of a housing of an inventive holder of FIG. 1.

At its end that projects out of the housing 12 in the use position, the holding element 20 has an insertion opening 26, which is circular in plan view, for the insertion of a beverage container, such as, for example, the drinks can 28 shown in FIG. 3a.

The displacement of the holding element 20 into the use position is effected by means of a spring element. In the embodiment of the invention shown and described, the spring element selected is a scroll spring 30. The scroll spring 30 is a flat spring which coils itself up as a result of its resilience, that is to say it is a tension spring. The scroll spring 30 is mounted on a roller 32 which is rotatably mounted on the end of the holding element 20 that is guided in the housing 12. The uncoilable end of the flat spring 30 is affixed to the dividing wall 14 of the housing 12 close to the mouth of the receiving chamber 18. An uncoiled portion of the flat spring 30 therefore lies on the outer or convex side of the dividing wall 14. The scroll spring 30 displaces the holding element 20 into the use position in which it projects out of the housing 12.

Displacement of the holding element 20 into the non-use position, in which it is recessed in the housing 12, is effected by hand against the spring force of the scroll spring 30. A releasable locking device holds the holding element 20 in the non-use position, in which it is recessed in the housing 12, against the spring force of the scroll spring 30. The locking device is constructed in the form of a push-push or the cardioid mechanism (known per se and therefore not described in detail here) with a locking bar 35 pivotally mounted on a side wall of the housing 12. The locking device is released by brief pressure in the direction of the non-use position on the holding element 20 locked in the recessed non-use position. The displacement movement is damped by a rotary damper 33 per se, which is installed in a seat 34 in the housing element 20.

At the end of the holding element 20 that projects out of the housing 12 in the use position there is mounted a shutter 36 which provides a flush closure to the opening of the receiving chamber 18 when the holding element 20 has been displaced into the recessed non-use position.

At the end of the holding element 20 that projects out of the housing 12 in the use position there is mounted a shutter 36 which provides a flush closure to the opening of the receiving chamber 18 when the holding element 20 has been displaced into the recessed non-use position.

A support element 38 is pivotally mounted on the holding element 20 of the holder 10 according to the invention by means of a pin-type connection. The support element 38 is arranged on an outer or convex side of the holding element 20 and has a curved shape corresponding to the curved shape of the holding element 20. The support element 38 therefore likewise has the shape of a portion of the curved surface of a cylinder. For the pivotal connection of the support element 38 to the holding element 20, the support element 38 has on each side an inwardly projecting pivot pin 40 which engages rotatably in a bearing hole 42 in the sides of the holding element.

When the holding element 20 is in the use position, two leg springs 44 placed onto the pivot pins 40 pivot the support element 38 into a position in which it projects outwards away from the holding element 20 at an acute angle, as shown in FIGS. 2a and 3a. In the use position, a semicircular recess 46 of the support element 38 is located above the holding element 20 approximately in register with the insertion opening 26. The recess 46 supports over a circumferential region a drinks container 28 inserted into the insertion opening 26 above the holding element 20, so that the drinks container 28 is reliably secured against tipping.

In the non-use position, the support element 38 has been pivoted into a position in which it rests against the outer side of the holding element 20. For that purpose, the support element 38 has integrally formed rigid pivot arms 48 which are arranged as arc-of a circle-shaped extensions on the support element 38 at its end remote from the recess 46. Pins 50 project outwards from the free ends of the pivot arms 48, which pins 50 engage in guide paths 51 of the housing 12. The guide paths 51 are in the form of arc-of-a-circle-shaped slots in side walls of the housing 12, they are arranged coaxially with the notional axis of symmetry of the housing 12 and are offset radially inwards with respect to the guide paths 24 for the holding element 20. The guide paths 51 for pivoting the support element 38 have, close to the mouth of the receiving chamber 18, a widened portion 52 towards the inside, forming a ramp 54.

When the holding element 20 is in its use position in which it projects out of the housing 12, the pins 50 of the pivot arms 48 of the support element 38 are located in the widened portion 52 of the guide paths 51. The widened portion 52 allows the pivot pins 50 to pivot inwards and thus allows the support element 38 to pivot, as already described, into the position in which it projects outwards away from the holding element 20 at an acute angle. When the holding element 20 is displaced into its non-use position, the pins 50 of the pivot arms 48 of the support element 38 slide along the ramps 54 and in so doing are moved outwards into the guide path 51. At the same time the pins 50 pivot the support element 38 inwards, against the spring force of the leg springs 44, into the position in which it rests against the outside of the holding element 20.

Figure 2C:
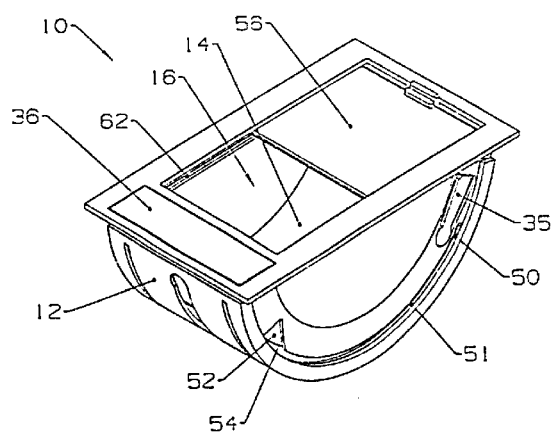

The storage compartment 16 can be closed by two covers 56, 58 each of which covers approximately half of the storage compartment 16. The covers 56, 58 have outwardly projecting slide pins 60 at the sides, which engage in straight grooves 62, arranged one above the other, in side walls of the housing 12, so that the covers 56, 58 are displaceable. To use the holder 10 according to the invention, the two covers 56, 58 are closed, as shown in FIGS. 2a, 2b and 3a. A drinks container 28 inserted into the insertion opening 26 of the holding element 20 which has been displaced into the use position stands on one of the two covers 56. When the holder 10 is not in use, one of the two covers 56, 58 can be pushed over the other of the two covers 58, 56, so that the storage compartment 16 is accessible. This is shown in FIG. 2. It will be understood that the covers 56, 58 can also be displaced and the storage compartment 16 opened when the holding element 20 has been displaced into the use position.

It will be understood that each of the elements described above, or two or more together, may also find a useful application in other types of constructions differing from the types described above.

While the invention has been illustrated and described as embodied in holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A holder for a beverage container, comprising a holding element provided with an insertion opening for a beverage container; slideway guidance means provided on said holding element so that said holding element is guided to be displaceable from a non-use position into a use position and vice versa, said holding element being curved in an arc in a displacement direction, said slideway guidance means being formed as an arcuate guidance and guiding said holding element in such a manner that said holding element is displaceable in an arc in direction of its curved shape.

2. A holder as defined in claim 1, wherein said holding element has a shape of a portion of a curved surface of a cylinder, said slideway guidance means being formed as an arc-of-a-circle guidance means.

3. A holder as defined in claim 1; and further comprising means forming a compartment in a chamber circumscribed by said holding element during its displacement.

4. A holder as defined in claim 1; and further comprising a support which is mounted on said holding element so that said support is pivotable back and forth between a position in which it rests against said holding element and a position in which it projects away from said holding element, and which in said position in which it projects away from said holding element, provides lateral support for a beverage container inserted into the insertion opening of said holding element.

5. A holder as defined in claim 4, wherein said support element is curved in an arc in correspondence with said holding element.

* * * * *